United States Patent
Pal et al.

(10) Patent No.: US 12,073,566 B2
(45) Date of Patent: Aug. 27, 2024

(54) SYSTEM AND METHOD FOR VISION BASED GRAPHICAL FLUID FLOW ANOMALY DETECTION FOR DISPLAY VERIFICATION

(71) Applicant: Honeywell International Inc., Charlotte, NC (US)

(72) Inventors: Debabrata Pal, Kolkata (IN); Abhishek Alladi, Kurnool (IN); Parag Ravindra Rao, Bangalore (IN); Luke M. Zeleznak, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 430 days.

(21) Appl. No.: 17/569,341

(22) Filed: Jan. 5, 2022

(65) Prior Publication Data
US 2023/0135867 A1   May 4, 2023

(30) Foreign Application Priority Data

Oct. 29, 2021 (IN) ............................. 202111049605

(51) Int. Cl.
*G06K 9/00* (2022.01)
*G06T 7/13* (2017.01)
(Continued)

(52) U.S. Cl.
CPC .................. *G06T 7/20* (2013.01); *G06T 7/13* (2017.01); *G06T 7/90* (2017.01);
(Continued)

(58) Field of Classification Search
None
See application file for complete search history.

(56) References Cited

U.S. PATENT DOCUMENTS 7,423,541 B2   9/2008 Miller
7,425,541 B2   9/2008 DuBois et al.
(Continued)

FOREIGN PATENT DOCUMENTS

CN   110836705 A   2/2020
CN   112087528 A   12/2020
(Continued)

OTHER PUBLICATIONS

Adobe, "Easily Edit Your Scanned PDF Documents with OCR", retrieved from https://acrobat.adobe.com/us/en/acrobat/how-to/ocr-software-convert-pdf-to-text.html as downloaded on Sep. 23, 2021, pp. 1 through 6.
(Continued)

*Primary Examiner* — Randolph I Chu
(74) *Attorney, Agent, or Firm* — Fogg & Powers LLC

(57) ABSTRACT

A system for fluid flow verification comprises a video recording device that captures frames of actual fluid or fluid display, and a processor coupled to the recording device. The processor hosts fluid verification modules, including a fluid flow rate verification module, and a fluid color verification module. The fluid flow rate verification module is operative to receive the frames; binarize region of interest, and compute histogram of white/black pixels; count white pixels to detect actual fluid quantity; determine whether actual fluid quantity matches expected fluid quantity; if there is a match, measure fluid change rate; determine whether there is steady fluid flow; if not, report fluid flow rate anomaly. The fluid color verification module is operative to: receive binarized region of interest and histogram; detect fluid color by extracting sample color mask of pixels; determine whether detected fluid color matches expected fluid color; if not, report fluid color anomaly.

20 Claims, 9 Drawing Sheets

(51) Int. Cl.
  *G06T 7/20* (2017.01)
  *G06T 7/90* (2017.01)
(52) U.S. Cl.
  CPC .............. *G06T 2207/10016* (2013.01); *G06T 2207/20081* (2013.01); *G06T 2207/20084* (2013.01)

(56) References Cited

U.S. PATENT DOCUMENTS

| | | | |
|---|---|---|---|
| 10,839,252 B2 | 11/2020 | Alladi et al. | |
| 2009/0039255 A1* | 2/2009 | Andrews | G01N 21/35 250/301 |
| 2011/0234757 A1* | 9/2011 | Zheng | G01N 15/1484 348/46 |
| 2014/0337045 A1* | 11/2014 | Scrivner | G16H 20/17 705/2 |
| 2015/0182679 A1* | 7/2015 | Parker | A61M 60/196 623/3.12 |
| 2017/0178322 A1* | 6/2017 | Hakuk | G06F 18/24 |
| 2018/0224854 A1* | 8/2018 | Mullan | G05D 1/104 |
| 2018/0308770 A1* | 10/2018 | Sugaya | H01L 21/6838 |
| 2019/0240084 A1* | 8/2019 | Rosati | A61F 13/5123 |
| 2019/0289202 A1* | 9/2019 | Kobayashi | G01S 5/16 |

FOREIGN PATENT DOCUMENTS

| | | | |
|---|---|---|---|
| CN | 212133798 U | | 12/2020 |
| CN | 112362900 A | | 2/2021 |
| CN | 212906367 U | * | 4/2021 |
| CN | 116440340 B | * | 1/2024 |
| KR | 100850307 B1 | | 8/2008 |
| KR | 20220015003 A | * | 2/2022 |
| TW | 202223208 A | * | 6/2022 |
| WO | 2011062352 A1 | | 5/2011 |
| WO | 2020101104 A1 | | 5/2020 |

OTHER PUBLICATIONS

Eppel et al., "Computer Vision-based Recognition of Liquid Surfaces and Phase Boundaries in Transparent Vessels, with Emphasis on Chemistry Applications", Technion—Israel Institute of Technology, https://www.mathworks.com/matlabcentral/fileexchange/46893-computer-vision-based-recognition-of-liquid-surface-and-liquid-level-in-transparent-vessel, as downloaded Sep. 23, 2021, pp. 1 through 36, Published: IL.

Infratec, "Thermography in Chemical Industry", https://www.infratec.in/thermography/industries-applications/chemical-industry/, as downloaded Sep. 23, 2021 pp. 1 through 18, Published: IN.

Mathworks, "What is Image Recognition?", https://in.mathworks.com/discovery/image-recognition-matlab.html, as downloaded Sep. 23, 2021, pp. 1 through 7, Published: IN.

NASA Glen Research Center, "Gas Density", https://www.grc.nasa.gov/www/k-12/airplane/fluden.html, as downloaded Sep. 23, 2021, pp. 1 through 3, Published: US.

Redavid, Claudio, et al., GSEEM Student at Malardalen University, Vasteras Sweden, "An Overview of Game Testing Techniques", https://www.semanticscholar.org/paper/An-Overview-of-Game-Testing-Techniques-Farid/4361a1882ca8ea296ff6411dbbaa90ca5fbc3ed4#paper-header, as downloaded Sep. 24, 2021 pp. 1 through 8.

Rumsey, Christopher L., "Turbulence Modeling Verification and Validation (Invited)", NASA Langley Research Center, Hampton, VA, as downloaded Aug. 17, 2021, pp. 1 through 13, Published: US.

Samcom, "Explosion Proof Cameras for Refineries and Fuel Depots", www.samcon.eu/en/industries/refineries-fuel-depots/, as downloaded Sep. 23, 2021, pp. 1 through 4.

Samcon, "Explosion Proof Cameras for Biogas Plants", www.samcon.eu/en/industries/biogas-plants/, as downloaded Sep. 23, 2021, pp. 1 through 5.

Samcon, "Industries Overview", www.samcon.eu.en/industries/, as downloaded Sep. 23, 2021, pp. 1 through 3.

Statistics How To, "Correlation Coefficient: Simple Definition, Formula, Easy, Steps", www.statisticshowto.com/probability-and-statistics/correlation-coefficient-formula/, as dowloaded Sep. 23, 2021, pp. 1 through 16.

Theinen et al., "Industry 4.0 and the Chemicals Industry Catalyzing Transformation Through Operations Improvement and Business Growth", Deloitte Consulting LLP, https://deloitte.com/us/en/insights/focus/industry/4-4/cheimicals-industry-value-chain.html, Jun. 8, 2016, pp. 1 through 15.

* cited by examiner

Measure total White Pixels when Beaker is full with chemical (TW)

Measure White pixels corresponding to present partial fluid Bar (PW)

Present fluid Quantity:
Fluid Qty = $\frac{PW}{TW}$

Instantaneous fluid change from last frame is number of white pixels in $\Delta w * \Delta h$ Correct Direction Incorrect Direction

SYSTEM AND METHOD FOR VISION BASED GRAPHICAL FLUID FLOW ANOMALY DETECTION FOR DISPLAY VERIFICATION

CROSS REFERENCE TO RELATED APPLICATION

This application claims the benefit of and priority to India Provisional Application No. 202111049605, filed on Oct. 29, 2021, which is herein incorporated by reference.

BACKGROUND

With rapid advancements in sensor technologies, minute details of each physical environment can be appropriately captured in present days and displayed in a dashboard for end users to take necessary actions. Graphical representation of fluid provides significant physical characteristics, including estimation of fluid quantity, fluid temperature, fluid movement direction, fluid rate of change, type of fluid, and many other associated anomalies.

Display of fluid graphics serves many potential industry needs, such as remaining fuel and rise of oil temperature notifications by displaying such on an aircraft primary flight display, or on an automobile display dashboard; type and temperature of liquid measurement under different chemical reactions in a chemical industry; decay of oxygen quantity monitoring on a medical display dashboard of a health care unit; remaining battery charge notification in mobile industries; and the like.

While display of all these various fluids play an important role to take necessary actions, testing of their graphical representation is manual, tedious, error-prone, and a safety-critical activity. In most cases, a highly challenging task for the verification engineer is to monitor the movement of fluid and identify any anomaly that can inevitably occur during execution of normal range and robustness test cases. Such anomalies can include, for example, filling of a fluid bar showing pixel increment from top to down; readout quantity corresponding to fluid amount is not matching; presence of sudden fluid fill or empty in a fluid bar layout in case of steady increment or decrement; increase of fluid crossing layout border; and many others.

The dynamic behavior of fluid flow can be captured by recording a video with help of a camera device or using a screen recorder in case of display simulation. However, performing video analytics to capture different attributes like fluid color transition, fluid quantity monitoring, presence of incremental or decremental spike detection, measuring viscosity and fluid type classification, and the like, are quite challenging as the extracted logical information needs to match with the test requirement.

A quick solution is to capture expected, actual videos and perform comparison where the expected video is manually reviewed to meet the test requirement prior to performing comparison. Again, comparison of two videos (actual and expected) become hard to synchronize as it requires the mapping of correspondent frames in case of multi-attribute verification of the same graphical fluid object under test. This introduces additional manual effort and, in some cases, introduces false triggers. Most of industry solutions suggest or practice the use of hardware triggers using genlock devices.

There will be various factors such as operating system overhead, processor speed, and graphics rendering capabilities of each system, which cause arbitary delays for every frame in both expected and actual video, resulting in a mis-match or a false positive even though both videos have been generated with same set of inputs. If a simple pixel-by-pixel approach is applied, there will be failure in comparison since different video frames provide different results due to the above described problem.

SUMMARY

A system for fluid flow verification comprises a video recording device operative to capture video frames of an actual fluid or a fluid display, and at least one processor operatively coupled to the video recording device. The processor hosts a plurality of fluid verification modules comprising a fluid flow rate verification module, a fluid color verification module, and an optional fluid type verification module. The fluid flow rate verification module includes instructions to cause the processor to: receive a plurality of video frames captured by the video recording device; for each of the video frames, binarize a region of interest and compute therefrom a histogram of white pixels and black pixels; count the white pixels in each of the video frames to detect an actual fluid quantity; determine whether the actual fluid quantity matches an expected fluid quantity at a given time; if the actual fluid quantity matches the expected fluid quantity, measure a fluid rate of change; determine whether there is a steady fluid flow based on the fluid rate of change; and if there is not a steady fluid flow, report a presence of a fluid flow rate anomaly. The fluid color verification module includes instructions to cause the processor to: receive the plurality of video frames captured by the video recording device; receive the binarized region of interest and the histogram of white pixels and black pixels, for each of the video frames, from the fluid flow rate verification module; detect a fluid color by extracting a sample color mask of pixels from a position of the white pixels in each binarized region of interest; determine whether the detected fluid color matches an expected fluid color at the given time; and if the detected fluid color does not match the expected fluid color, report a presence of a fluid color anomaly.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
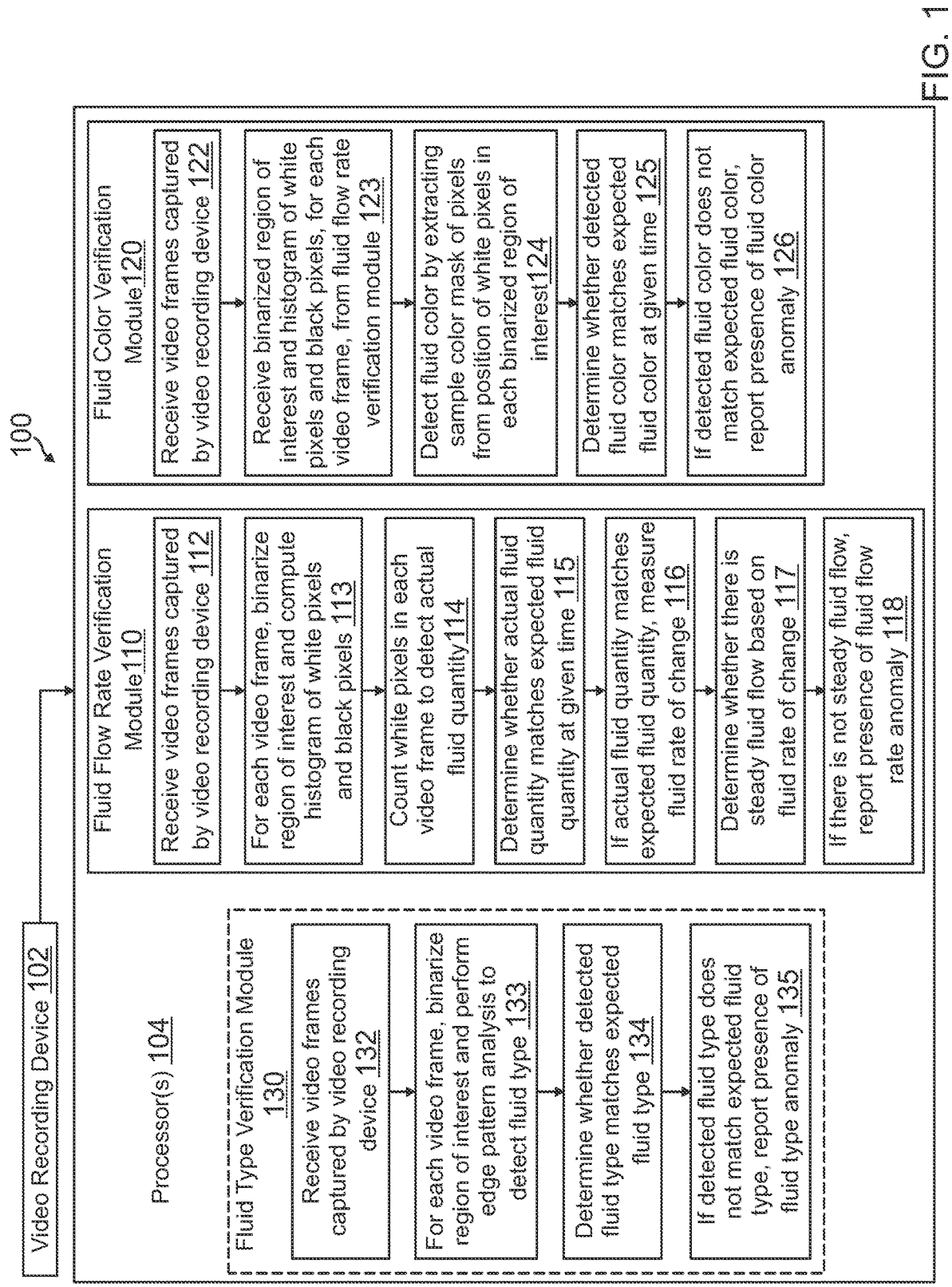
FIG. 1 is a block diagram of a system for fluid flow verification, according to an exemplary embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for vision based graphical fluid flow anomaly detection for display verification is described herein. The present approach allows for recognizing fluid dynamics patterns, recognizing fluid types, finding anomalies, and thus provides for accurate comparison results. In particular, the present approach provides solutions to detect and report the behavior of a fluid (e.g., steady increase\decrease or presence of a spike), the type of a fluid, the color of a fluid, and maps to different characteristics of the fluid, such as temperature, presence of pollutant, criticality level based on quantity, or the like.

The present system, when integrated with a camera, can also monitor the fluid quantity in storage tanks and chemical plants, without physical sensors contacting the fluid. In addition, the present methods can apply basic image processing to deep learning-based algorithms on video frames in solving vision-based fluid flow inspection issues.

In conventional methods, the verification of fluid flow is performed manually, and in some cases, videos are captured and manual verification of videos is performed. This verification approach often is time consuming, tedious, and introduces the probability of false positives. As systems become more advanced and automated, detecting sudden changes in fluid flow is nearly impossible. In addition, existing pixel-by-pixel comparison solutions are limited due to the dynamic nature of fluid flow, and only static images can be compared in such an approach. Users spend manual efforts in monitoring the change in fluid values and graphical representation of the fluid. Sudden changes in the inputs and monitoring manually can result in missing failure scenarios.

The present approach overcomes the above issues by providing faster and more accurate methods of fluid flow comparison; by being applicable to dynamic fluid changes; by allowing for removal of known limitations in graphics verification in safety critical industries; and by improving automated monitoring and reporting, to eliminate false positives and to accurately report inconsistencies in a fluid system.

The present method uses video processing with a correlation-based approach that does not require physically updating the system, yet provides an accurate comparison of fluid levels. Processing frames recorded from a video camera can provide a comparison of level change of fluid. Moreover, since the data can be captured digitally, the system can directly process digital data to raise an alarm based on a predefined threshold for the fluid quantity or state of the fluid. This can alleviate additional processing for conversion of analog data to digital and then processing the data. This approach also helps in addressing small resolution of digital image without getting corrupted by analog quantization process.

In one implementation, the present method simulates parameters and verifies fluid dynamic response, by recording output from a display device and processing the same to retrieve an actual graph response. This actual graph can be compared with an expected graph with known simulation input behavior with respect to varying time to detect a mismatch.

In case the of aerospace life-critical software validation, it is currently mandatory to verify graphics manually, apart from other modes of software testing of codes, since the psychological effect of graphics and intuition derived out of graphical behavior requires human perception. The present method provides a technique of extracting different behaviors from graphical fluid flow, with a recognition system that is void from biased decision making and inherent cases of verification from diversified human psychological verification processes.

The present methods for graphical verification and physical verification of fluid flow is applicable in various industries. For example, the following are different industry applications where displays include fluid flow, and verification of these are typically performed manually and thus would benefit from the present methods. Such industry applications include: aerospace and automobile industries (e.g., fluid displays of fuel and oil quantity); medical industry (e.g., displays to monitor patients); storage tank monitoring; gaming industry (e.g., verification of player health status); hydraulic calculations; water transport service industry; chemical and food processing industries; simulation of cooling technology; fluid mechanics pattern verification; capacitance wire-mesh sensors; mobile device and computer industry (e.g., verification of remaining battery power); and analog thermometer calibration.

In the chemical and food processing industries, when a sensor comes in physical contact with fluid inside a container, there will be delay in the response time due to physical interference with the fluid flow and some wear and tear in the sensor over a time period. Sensor sensitivity varies with temperature and pressure, and since such sensors are analog devices, it takes a certain responsivity time. Such an approach is quite risky for chemical plants where the chemical can react with the sensor. The present technique can be applied in conjunction with an external camera as a replacement for sensors, which will alleviate above mentioned problems.

Prior to describing the present system and method in greater detail, various unique features are described briefly as follows.

Steady Fluid Flow Detection. The present approach applies video analytics by detecting fluid pixels in each frame and tracking pixel counts in time series. By applying binarization in each frame and measuring rate of change in number of pixel counts, the present method can determine the increment or decrement rate in fluid quantity. For a steady flow, the differential pixel increment or decrement remains constant.

Online Fluid Flow Anomaly Detection. Once fluid quantity is detected per frame, a neural network-based solution can be used to predict next frame fluid quantity pixels, which in terms refer to the amount of real chemical\fluid presence in the future (i.e., time series prediction). By comparing a predicted value with a present fluid amount, this method can find an anomaly when a certain threshold is crossed, and an alarm can be raised. This helps in chemical industries, where certain chemical reactions causing sudden changes in amounts need to be stopped immediately before further mixing of chemical reagents. In the case of fluid graphics, this method helps in identifying software bugs for requirement-based testing.

Fluid Type Classification. A statistical modelling of fluid type detection based on analyzing chemical surface does not always correctly tell about fluid type, since there can exist a lot of bubbles at the surface of the chemical, during transition from a liquid to gaseous state, and ripples while boiling. In case of container shake, all fluids do not exhibit similar properties. For example, when three vessels containing water, oil, and mercury are shaken independently, different changes in surface level can be observed based on their viscosity. The present neural network-based solution can learn these properties by training with different chemical images under reaction/perturbation. Based on this learning, the neural network can predict the chemical type and underlying properties in order to classify a fluid.

Fluid Color and its Transition Detection. Apart from quantity estimation, the present method provides attention to fluid color recognition for each video frame. The method records the timestamp corresponding to the color transition. This helps in detecting 'cold'/'warm' state, or other indicators. This also provides a good trigger to notify a user if a certain chemical color is obtained based on reaction in a long duration experiment.

Resolution Independent Solution. The present method is independent to fluid graphics resolution. Since the method estimates pixel count in each subsequent frame, this approach is even applicable to verify remaining battery charge in very small battery icons in a mobile device or computer. The present approach is agnostic to indication scale length. For the entire scale range (in terms of pixels), it is mapped against a numeric range of that fluid. To validate different conditions, like 25% filled, half-filled, etc., the method computes a unitary method of the respective fluid display—which makes it agnostic to scale length.

Mapping to Readout. An additional feature provided is to compare detected fluid quantity from display graphics with displayed readout quantity with different units. This requires establishing a mapping function between the amount of maximum pixel quantity in a layout with the highest numeric range at a given units of corresponding readout. Any deviation is recorded as a 'Fail' scenario.

Safe, Low Cost External Image Capturing and Analytics. Instead of inserting a sensor inside a vessel to record fluid quantity and other parameters, the present approach provides a solution by computing, with an external camera, captured image data. This solution is effective and safe in the case of many experiments where it is infeasible to put a sensor inside a vessel, as the sensor can be affected by the chemical reaction or solution temperature.

Further details related to the present system and method are described as follows and with reference to the drawings.

FIG. 1 illustrates a system 100 for fluid flow verification, according to an exemplary embodiment. The system 100 includes a video recording device 102, such as a video camera, which is operative to capture video frames of an actual fluid or a fluid display. The system also includes at least one processor 104 operatively coupled to video recording device 102. The processor 104 is operative to host a plurality of fluid verification modules, including a fluid flow rate verification module 110, a fluid color verification module 120, and an optional fluid type verification module 130. The fluid verification modules include processor readable instructions to cause processor 104 to perform various fluid verification functions.

In particular, fluid flow rate verification module 110 is operative to receive a plurality of video frames captured by video recording device 102 (block 112), and for each of the video frames, binarize a region of interest and compute a histogram of white pixels and black pixels (block 113). Thereafter, the white pixels are counted in each of the video frames to detect an actual fluid quantity (block 114). A determination is then made whether the actual fluid quantity matches an expected fluid quantity at a given time (block 115). If the actual fluid quantity matches the expected fluid quantity, a fluid rate of change is measured (block 116). A determination is then made whether there is a steady fluid flow based on the fluid rate of change (block 117). If there is not a steady fluid flow, a presence of a fluid flow rate anomaly is reported (block 118).

The fluid color verification module 120 is operative to receive the video frames captured by video recording device 102 (block 122), and to receive the binarized region of interest and histogram of white pixels and black pixels, for each of the video frames, from fluid flow rate verification module 110 (block 123). A fluid color is then detected by extracting a sample color mask of pixels from a position of the white pixels in each binarized region of interest (block 124). A determination is then made whether the detected fluid color matches an expected fluid color at the given time (block 125). If the detected fluid color does not match the expected fluid color, a presence of a fluid color anomaly is reported (block 126).

The optional fluid type verification module 130 is operative to receive the plurality of video frames captured by video recording device 102 (block 132). For each of the video frames, a region of interest is binarized and an edge pattern analysis is performed to detect a fluid type (block 133). A determination is then made whether the detected fluid type matches an expected fluid type (block 134). If the detected fluid type does not match the expected fluid type, a presence of a fluid type anomaly is reported (block 135).

Figure 2:
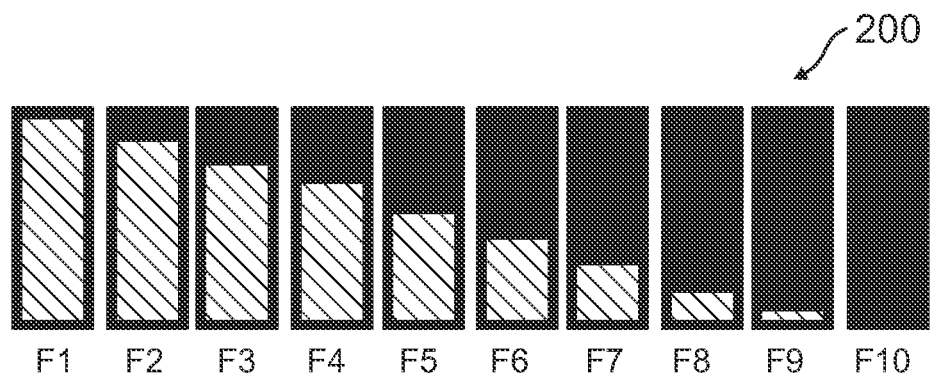
FIG. 2 is a schematic diagram of an example video frame set, depicting fluid flow graphics in the form of rectangular vertical fluid bars, and which can be used for fluid flow verification.

FIG. 2 shows an example video frame set 200 (F1 to F10), such as captured by a recording device used in the system for fluid flow verification. In particular, FIG. 2 depicts decreasing fluid flow graphics in the form of rectangular vertical fluid bars for frames F1 to F10, with a steady fluid flow decrement from completely full (F1) to completely empty (F10). The following are some example properties that can be extracted by performing video analytics on the captured video frames in FIG. 2 and analyzing the detected attributes over a time series: fluid decreased over time; steady fluid flow detection; laminar flow fluid surface; vertical decrement; and temperature controlled 'ok' state (e.g., green color).

A brief description follows of some techniques used to implement the present fluid flow verification method, as described in more detail hereafter.

Binary Image and Trigger. A color image is a combination of pixels, and each pixel is made up of a three 8-bit number representing a Red (R), Green (G), and Blue (B) channel value. Optionally, another 8-bit number can be used corresponding to an alpha channel. The 8-bit number value varies between 0 and 255. After applying a threshold, each pixel becomes binary (0/1) creating a binary image. As described further hereafter, an intra-comparison approach is applied on the video frames, in-between frames of the same video. If a state transition or change is observed, the difference is stored or marked as a trigger.

Correlation Method. In the correlation method, a specific region of expected and actual images are compared to detect the differences in color vectors in combinations of pixels (R, G, B). A convolution algorithm can be applied on the differences obtained from the comparison. For example, a specific region can refer to a graphical fluid layout. A video is a combination of consecutive images (frames) over a time period. In any video, the following parameters will be in common: name of the application/window for which the video needs to be captured; time stamp (when the video is captured); time duration of the video (duration of the video captured); data rate; and frames per second. In the present approach, the frames in the video are split and the intra-comparison method is applied to detect the change in state within a video frame.

Splitting Frames. In applying the present approach there is a need to identify the region of interest in the entire video which needs to be evaluated. The region of interest is any polygonal shape used to define the applicable area to apply the present method. Once the region of interest is identified, the video is split into frames at that region. The number of frames depend on the speed and length with which the video has been captured (e.g., 20 frames per second (FPS), 30 FPS, etc.).

Intra-Comparison. The intra-comparison approach processes entire frames after the split and compares successive frames to detect if the frames are the same (e.g., between the frames sometimes there may not be any change depending on the input provided), or if there is a change between two frames. The correlation method is applied for comparison of two successive frames, providing support in detecting the triggers (successive frames where a state transition is observed for the object), and identifying the frames to be compared. The frames are then converted to binary images and triggers are detected when there is a change in fluid quantity. The triggers are used to automatically detect the change in state. As the video is a collection of frames, there will be no change between one frame to another unless there are test inputs or an event is triggered. Hence, identifying the total pixel change (amount of fluid quantity) from one frame to another frame is done during the intra-comparison approach. To differentiate between frames and triggers, the frames are denoted as F1, F2, etc., and the triggers are denoted as T1, T2, etc.

Figure 3:
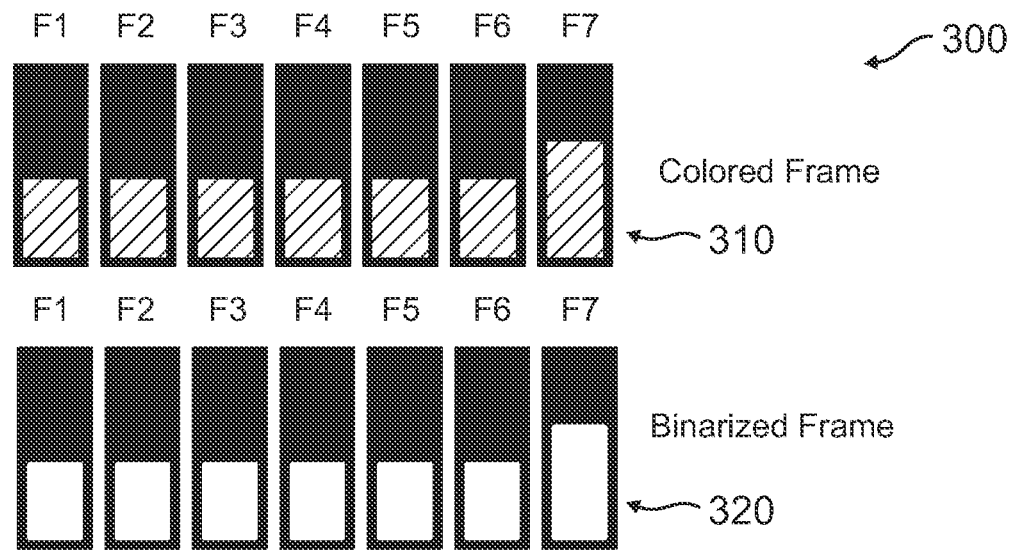
FIG. 3 is a schematic diagram of another example video frame set, depicting fluid flow graphics in the form of rectangular vertical fluid bars, and which can be used for fluid flow verification.

FIG. 3 shows another example video frame set 300 (F1 to F7), such as captured by a recording device used in the system for fluid flow verification. In particular, FIG. 3 depicts fluid flow graphics in the form of rectangular vertical fluid bars for colored frames 310, and corresponding binarized frames 320. FIG. 3 illustrates an example of a change in fluid quantity (e.g., fuel) in frames F1 to F7. As shown, a change in the vertical fluid quantity occurs between the sixth and seventh frame (F6 and F7), where a trigger (T1) is detected based on the correlation method, which finds the similarity between two data sets. Since the video split frames suffer from noise, a pixel-by-pixel comparison method results in false negatives. By applying the correlation method, a threshold can be set that will eliminate the false negatives and provide accurate comparison results.

Figure 4A:
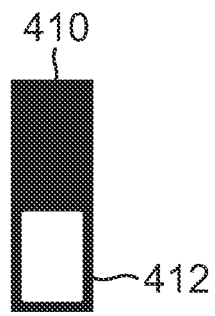
FIG. 4A is a schematic diagram of an example region of interest in a video frame provided with a fluid graphics layout border.
Figure 4B:
FIG. 4B is a schematic diagram of an example region of interest in a video frame provided without a fluid graphics layout border.

The present approach is also applicable for a region of interest in a video frame that is provided with or without a border. FIG. 4A illustrates an example of a region of interest 410 in the form of a vertical fluid bar that is provided with a fluid graphics layout border 412. FIG. 4B illustrates an example of a region of interest 420 in the form of a vertical fluid bar that is provided without a fluid graphics layout border. The border does not affect the results because the border does not change. Hence, the border does not impact the detection of a fluid.

Figure 5:
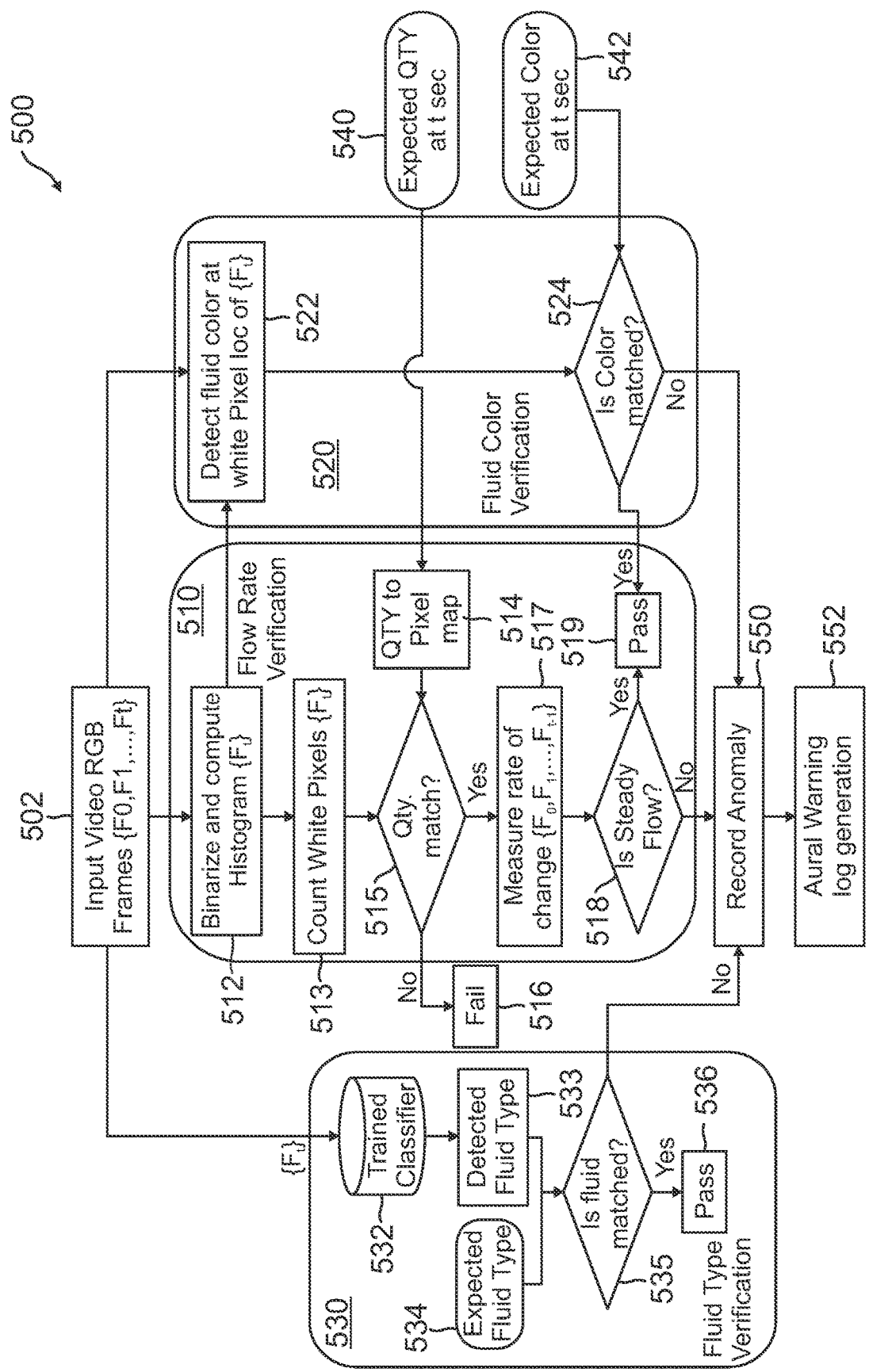
FIG. 5 is a flow diagram of a method for fluid flow verification, according to an exemplary implementation.

FIG. 5 is a flow diagram of a method 500 for fluid flow verification, according to an exemplary implementation. The method 500 can be implemented with a plurality of fluid verification modules, including a fluid flow rate verification module 510, a fluid color verification module 520, and an optional fluid type verification module 530 (e.g., for chemical industries). A standard video capture method (e.g., desktop application, frame grabber, or camera) can be used to obtain a video when test inputs are provided to the system under test, or when a chemical reaction is started (e.g., in chemical industry automation).

The method 500 obtains a plurality of input video RGB frames $\{F_0, F_1, \ldots, F_t\}$ at 502, which are based on captured video frames of an actual fluid or a fluid display. The input video RGB frames are directed to each of fluid flow rate verification module 510, fluid color verification module 520, and fluid type verification module 530 (when employed). The fluid flow rate verification module 510 is operative to binarize a region of interest and compute a histogram of white pixels and black pixels (block 512), based on each of the video RGB frames. A count of the white pixels is then made for each of the frames to detect an actual fluid quantity (block 513). An expected fluid quantity (QTY) at a given time (t sec) is retrieved from a database 540 and correlated with the actual fluid quantity using a pixel map (block 514). A determination is then made whether the actual fluid quantity matches the expected fluid quantity at the given time (block 515). If not, then a fail is indicated at 516. If the actual fluid quantity matches the expected fluid quantity, then a fluid rate of change is measured $\{F_0, F_1, \ldots, F_{t-1}\}$ (block 517). A determination is then made whether there is a steady fluid flow based on the fluid rate of change (block 518). If yes, then a pass is indicated at 519. If there is not a steady fluid flow, method 500 records an anomaly at 550 (i.e., fluid flow rate anomaly). An aural warning and log generation for the fluid flow rate anomaly can then be produced at 552.

The fluid color verification module 520 receives the input video RGB frames, and the binarized region of interest and histogram from fluid flow rate verification module 510. These are used to detect a fluid color at each white pixel location $\{F_t\}$ (block 522), by extracting a sample color mask of pixels from a position of the white pixels in each binarized region of interest. An expected fluid color at a given time (t sec) is retrieved from a database 542 and sent to fluid color verification module 520. A determination is then made whether the detected fluid color matches the expected fluid color at the given time (block 524). If yes, then a pass is indicated (at 519). If the detected fluid color does not match the expected fluid color, method 500 records an anomaly at 550 (i.e., fluid color anomaly). An aural warning and log generation for the fluid color anomaly can then be produced at 552.

The optional fluid type verification module 530 receives the input video RGB frames into a trained classifier (block 532), which can be classifier model operative to generate a detected fluid type based on the RGB video frames. The detected fluid type is output from the trained classifier (block 533), and an expected fluid type is retrieved from a database 534. A determination is then made whether the detected fluid type matches the expected fluid type (block 535). If yes, then a pass is indicated at 536. If the detected fluid type does not match the expected fluid type, method 500 records an anomaly at 550 (i.e., fluid type anomaly). An aural warning and log generation for the fluid type anomaly can then be produced at 552.

Further details of the present fluid flow verification method, such as shown in FIG. 5, are described as follows.

Fluid Flow Rate Verification

This section describes the methodologies used to estimate fluid quantity per frame, and the increment/decrement rate. This information is helpful in detecting anomalies. An anomaly can occur if a fluid graphics pixel keeps on incrementing from top-to-bottom in its layout in case of fluid filling time; if there happens to be a sudden increment/decrement while steady flow is expected, but the system is affected by a warm start; or if there exists certain software bugs. An excess amount of fluid pixels crossing a predefined layout can also cause an anomaly, which generally gets detected during a robust-test case execution.

For the input video RGB frames, once a video starts recording, the following method can be applied to successively received live captured frames $\{F_0, F_1, \ldots, F_t\}$; or in case of an offline video, the frames are split and the following method is applied for each frame $\{F_t\}$.

A. Binarize and Compute Histogram to Detect Fluid Quantity

In an initial step, the fluid flow rate verification module is operative to binarize a region of interest in the received frames and compute a histogram to detect a fluid quantity. The binarization of the region of interest creates high contrast with any color combination. Hence, an edge can be detected reliably, as pixels are in 0 (black) or 1 (white) form. In each frame, the region of interest (e.g., fluid display) is binarized and a histogram of white and black pixels are calculated. White pixels represent the presence of fluid, whereas black pixels represent fluid absence. The ratio of white to black pixels for each frame produces a fluid's relative quantity. The decision of a fluid bar state (e.g., empty\partial\full) is taken based on this analysis. Edge detection is applied on a binary image instead of an RGB image to reduce the processing time by a factor of 3, due to the presence of a single channel in the binary image compared to 3 channels in the RGB image.

The binarization technique is used initially, as two similar color images from a video frame split (due to compression loss in the video) can have a slight variation in color vectors (R, G, B) between frames. Due to this factor, a direct comparison will fail, and the binarization will effectively provide an advantage in tracking the pixel values and applying the present approach. The below equations can be applied to detect the fluid quantity once the white pixels (W) and black pixels (B) are computed.

B. Count White Pixels

A count of the white pixels is then made for each of the frames to detect an actual fluid quantity. In one example, this step can provide an indication of empty, full, or partial fuel bars. For an empty fuel bar, if there are no white pixels (W) in a region of interest, the fuel quantity is reported to be empty, which can be expressed as:

$$W/B == 0$$

For a full fuel bar, if there are no black pixels in a frame, within the cropped region of interest, the fuel quantity is reported to be full. Intuitively, the total W pixels become the number of total pixels in the fluid region of interest, which can be expressed as:

$$W/B == \infty$$

For a partial fuel bar, when the ratio of total number of white pixels and black pixels are between 0 and 100%, the fuel quantity is reported to be partially full with a detected quantity.

C. Comparison with Actual Fluid Quantity

In the next step, a comparison with the actual fluid quantity is carried out. An input from a test as an expected fluid quantity is received. Using a simple unitary method, the maximum range of fluid quantity under a normal test case is mapped with the total number of white pixels at the fluid graphics layout under a full state. For each partial fluid condition from successive frames, the actual fluid quantity is mapped with the expected fluid quantity. A certain threshold can be applied at this stage. In this way, the present approach becomes capable of measuring whether the actual fluid quantity at a timestamp t is following the expected fluid quantity or not, even for the smallest possible resolution (e.g., display of battery icons).

Figure 6A:
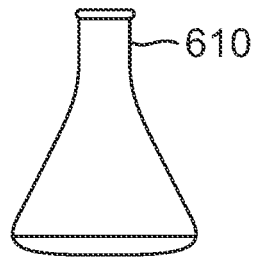
FIGS. 6A-6C are schematic diagrams of example video frames depicting non-rectangular displays for a fluid container, and which can be used for fluid flow verification.
Figure 6B:
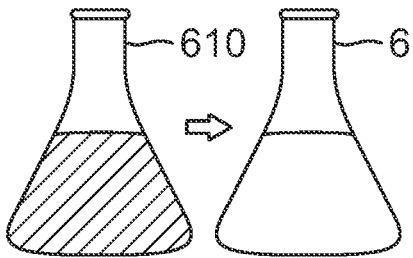
Figure 6C:
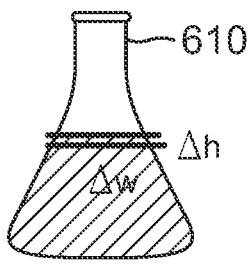

For a non-rectangular display where height (H) and width (W) are varying, such as in chemical vessel/beaker displays, the present approach is still applicable. An example is shown in FIGS. 6A-6C, which are schematic diagrams of example video frames depicting non-rectangular displays for a fluid container. As shown in FIG. 6A, the total white pixels (TW) are measured for a frame when a beaker 610 is full of a chemical. Next, as shown in FIG. 6B, the white pixels for a frame of beaker 610 are measured corresponding to a present partial fluid bar (PW). The present fluid quantity (Qty) for a frame of beaker 610 is then determined based on the following expression:

$$\text{Fluid Qty} = PW/TW.$$

As depicted in FIG. 6C, an instantaneous fluid change from the last frame of beaker 610 is the number of white pixels in $\Delta W * \Delta H$.

D. Measure Rate of Change

To measure the fluid change rate from the last frame to the present frame, both the direction and magnitude of a fluid filling or empty condition are analyzed.

1. Fluid Flow Direction Analysis

Fluid flow direction verification is an important property to verify for developing safety-critical software. Histogram analysis can be applied to detect the fluid quantity, but it does not give information to identify the flow direction. The present approach can also detect if the fluid direction is incorrect based on the design of the display.

Figure 7A:
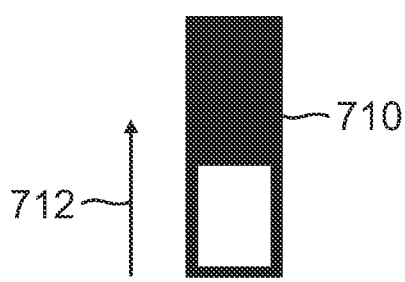
FIG. 7A is a schematic diagram depicting an example rectangular vertical fluid bar with a correct direction of fluid filling.
Figure 7B:
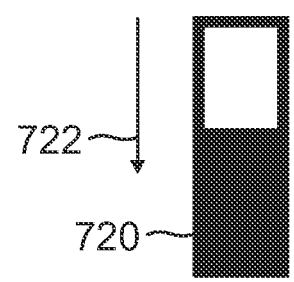
FIG. 7B is a schematic diagram depicting an example rectangular vertical fluid bar with an incorrect direction of fluid filling.

An example is shown in FIGS. 7A and 7B, where a fluid was expected to fill from bottom to top, but is shown as filled from top to bottom. FIG. 7A is a schematic diagram depicting a rectangular vertical fluid bar 710 with a correct direction of fluid filling (bottom to top) indicated by arrow 712. FIG. 7B is a schematic diagram depicting a rectangular vertical fluid bar 720 with an incorrect direction of fluid filling (top to bottom) indicated by arrow 722. The present approach detects this incorrect direction as a failure case and reports the mismatch. The same approach can be applied on fluid bars of any shape, alignment, or orientation.

Figure 8A:
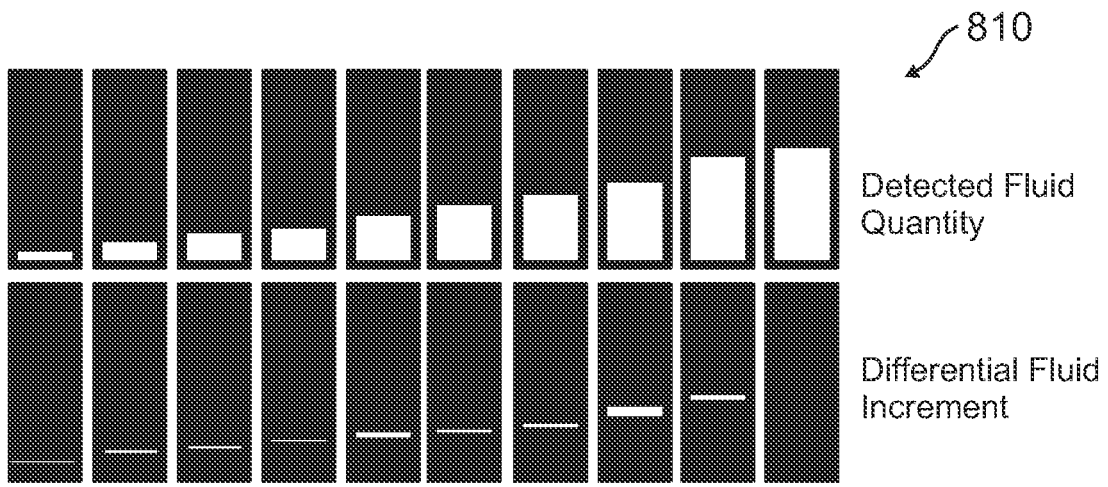
FIG. 8A is a schematic diagram of an exemplary series of differential trigger frames received by frame subtraction to detect fluid flow direction.
Figure 8B:
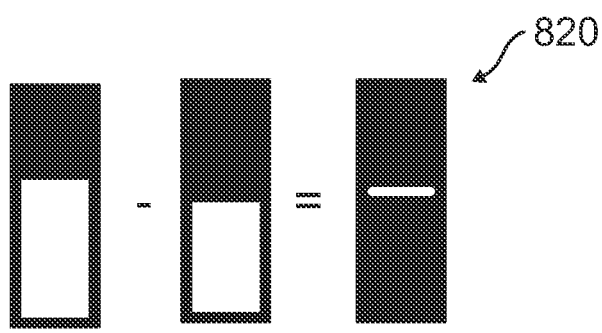
FIG. 8B is pictorial representation of an exemplary differential fluid quantity after the subtraction of successive binary frames.

For this scenario, histogram analysis is not sufficient to detect fluid flow direction. To detect fluid flow direction, a difference of each state transition is calculated based on triggers. The difference of fluid increase/decrease is calculated by subtracting the $i^{th}$ frame from $i+1^{th}$ frame based on a trigger, and these difference frames are calculated for all trigger frames. FIG. 8A shows a series of differential trigger frames 810 received by frame subtraction to detect fluid flow direction, including frames for detected fluid quantity and frames for differential fluid increment. FIG. 8B provides a pictorial representation 820 of the differential fluid quantity after the subtraction of $i+1^{th}$ binary frame from the $i^{th}$ binary frame.

The algorithm set forth in Table 1 below can be applied to determine fluid flow with respect to an axis of the frame.

TABLE 1

| Initial condition | Where, t = frame in which trigger is detected<br>W = number of white pixels<br>B = number of black pixels<br>Partial[t] = W/B; Fluid_Intake_Flag = −1% Flag to indicate increment/decrement |
|---|---|
| Process logic | for i = 1: length (TriggerImages)<br>  % Fluid filling/increasing<br>  if ((Partial[t+1]>Partial[t]) && (Y_Pos[t+1]>Y_Pos[t]))<br>    Fluid_Intake_Flag = 1<br>  end<br>  % Fluid emptying/decreasing<br>  if ((Partial[t+1]<Partial[t])&& (Y_Pos[t+1] <Y_Pos[t]))<br>    Fluid_Intake_Flag = 0<br>  end<br>end<br>return Fluid_Intake_Flag |

Figure 9:
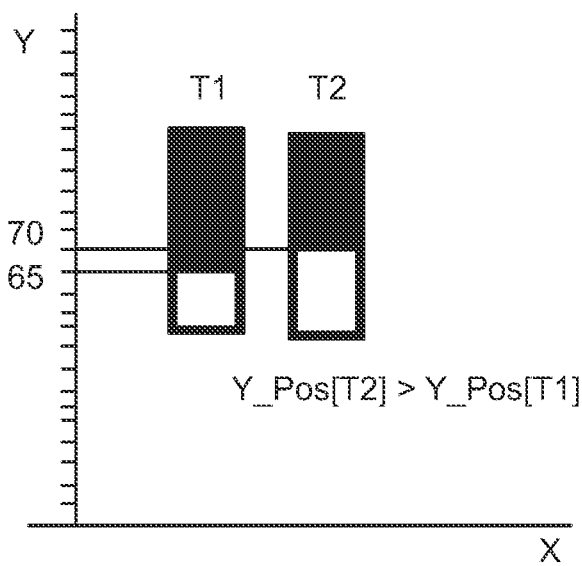
FIG. 9 is a graphical representation of the change in fluid quantity in two binary frames when a trigger is detected.

FIG. 9 is a graphical representation of fluid filling from the $i^{th}$ frame to the $i+1^{th}$ frame. FIG. 9 depicts the change in fluid quantity in two frames when a trigger is detected. For example, a first trigger T1 has 65 units of fluid, and a second trigger T2 has 70 units of fluid. This indicates the fluid direction is increasing, which is expressed as:

$Y\_Pos[T2]>Y\_Pos[T1]$.

2. Fluid Flow Magnitude Analysis

To form a steady flow, fluid should increase/decrease in the same direction at a constant magnitude.

Figure 10:
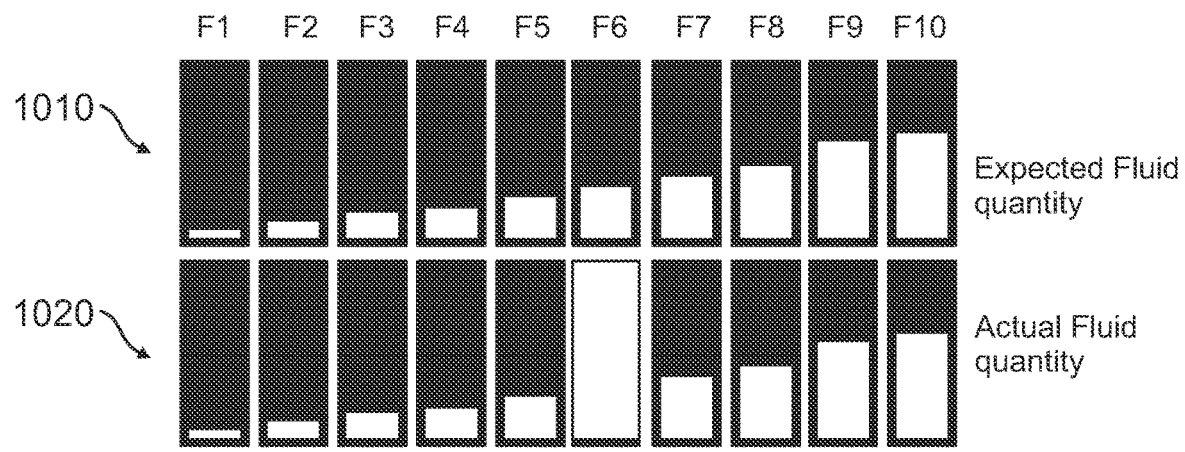
FIG. 10 is a schematic diagram of an exemplary series of frames depicting rectangular vertical fluid bars, including expected fluid quantity and actual fluid quantity.

FIG. 10 is a schematic diagram of an exemplary series of frames depicting rectangular vertical fluid bars (F1 to F10), including frames 1010 for expected fluid quantity and frames 1020 for actual fluid quantity. As shown in FIG. 10, it can be observed that even though fluid flow increases in each frame in the same direction, in the 6th frame (F6) a sudden spike (completely filled) is observed. This creates an anomaly and a tester will need to report this software bug. This can be caused by a system warm start.

Figure 11:
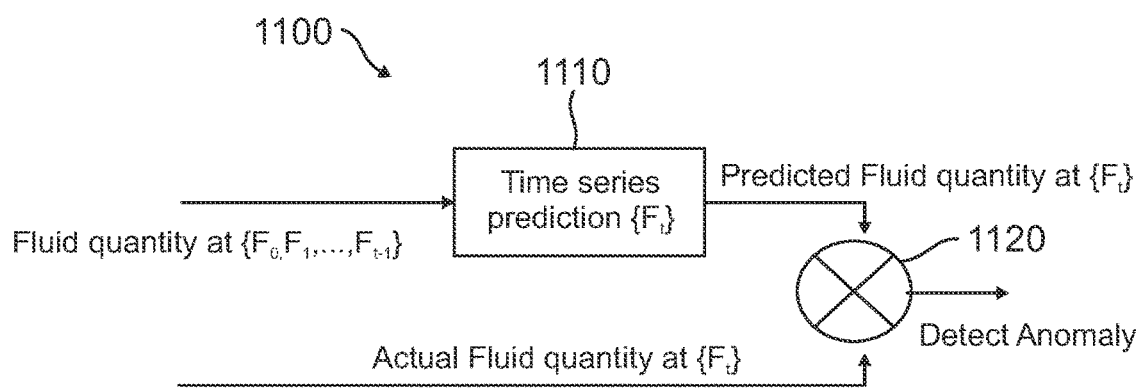
FIG. 11 is a flow diagram of a time series-based prediction method for detecting fluid flow magnitude.

However, in many scenarios, expected fluid quantity per frame may not be defined. In such scenarios, a time series-based prediction method 1100 can be used for detecting fluid flow magnitude, as shown in the flow diagram of FIG. 11. There, a fluid quantity value from previous frames for a defined window $\{F_0, F_1, \ldots, F_{t-1}\}$ is received by a time series prediction module 1110, which calculates and outputs a model predicted value for a fluid quantity at a present frame $\{F_t\}$. The model predicted value is compared with an actual fluid quantity at present frame $\{F_t\}$ at 1120. If the actual fluid quantity is quite deviated from the model predicted value, an anomaly can be detected for that frame.

E. Steady Fluid Flow Detection

Once the relative quantity of fluid in every frame is detected and the flow direction is determined, a decision about flow rate can be made (i.e., increasing or decreasing). For a vertical fluid bar, if the first frame contains empty fluid and the last frame contains full fluid, with intermediate frames incrementing from bottom to top, it is considered that fluid is increasing. Similarly, if the first frame contains full fluid and the last frame contains empty fluid, with intermediate frames decrementing from top to bottom, it is considered that fluid is decreasing.

In a similar manner, a decision can be taken for a horizontal fluid bar. In each frame, the presence of an anomaly is also verified based on a magnitude prediction. If the fluid increases\decreases in a same direction with constant rate, it is considered as steady flow.

Figure 12A:
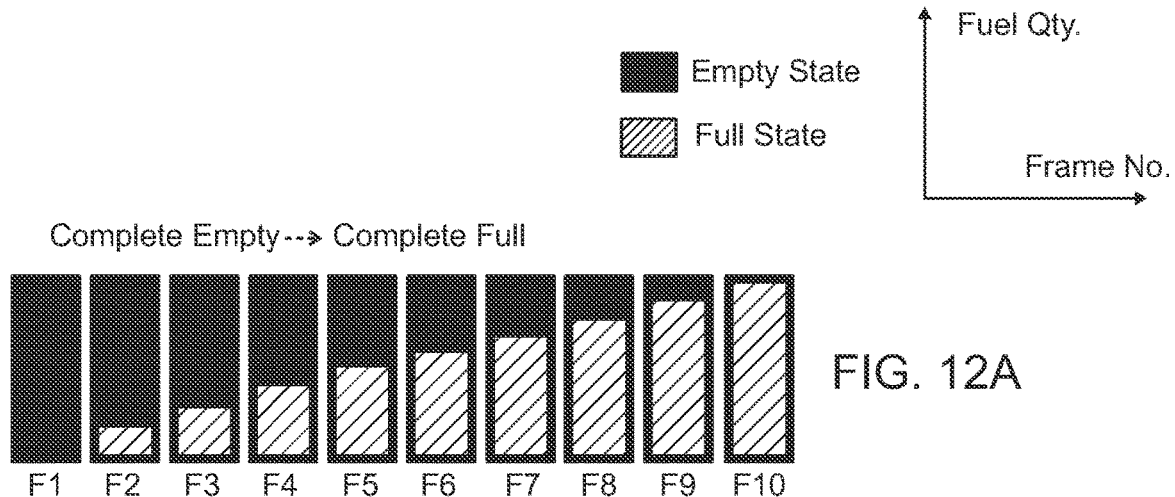
FIGS. 12A-12D are exemplary graphical fluid flow diagrams for a series of frames of rectangular vertical fluid bars, depicting a steady fluid flow.
Figure 12B:
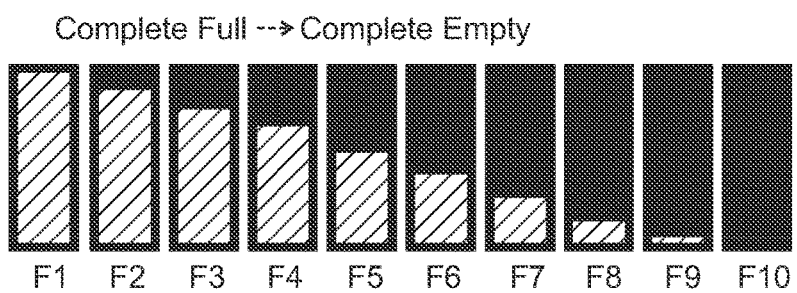
Figure 12C:
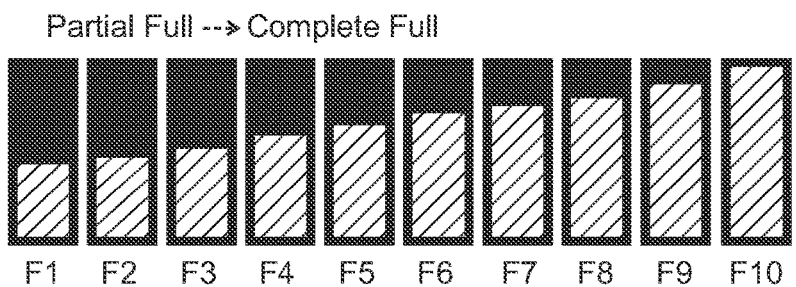
Figure 12D:
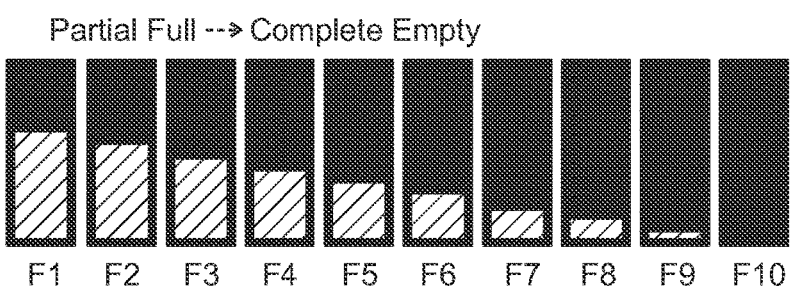

FIGS. 12A-12D are exemplary graphical fluid flow diagrams for a series of frames of rectangular vertical fluid bars (F1 to F10), depicting a steady fluid flow, and representing different scenarios for fluid flow detection. FIG. 12A shows a steady fluid flow, from completely empty (F1) to completely full (F10). FIG. 12B depicts a steady fluid flow, from completely full (F1) to complete empty (F10). FIG. 12C shows a steady fluid flow, from partially full (F1) to completely full (F10). FIG. 12D depicts a steady fluid flow, from partially full (F1) to completely empty (F10).

Fluid Color Verification

The fluid color plays an important role in many applications. For example, a 'green' color might signify a normal temperature or normal operation; a 'yellow' color might signify a hot temperature or caution; and a 'red' color might signify an extreme hot temperature when a fluid is associated with temperature. Similarly, in graphical fluid representations, a green color might indicate full fluid; a yellow color might indicate caution in fluid level; and a red color might indicate critical levels of a fluid.

To determine the color of a fluid, a sample color mask of size X*X (X is always greater than 1) pixels is extracted from the position of white pixels of the binarized frame. The mean value under the color mask covered area is then compared against stored colors. Each color can signify characteristics of a fluid, such as state of the fluid, level of the fluid, condition of the fluid, or the like.

Figure 13:
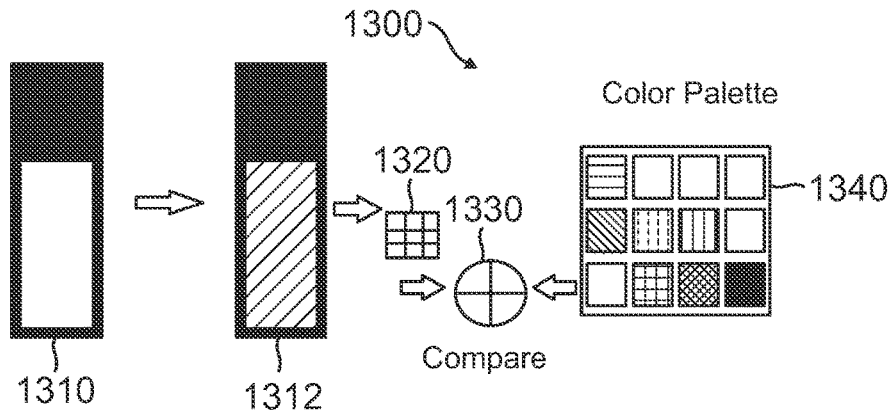
FIG. 13 is pictorial representation of an exemplary method to provide recognition of a fluid color.

FIG. 13 is pictorial representation of an exemplary method 1300 to provide recognition of a fluid color. A sample color mask 1320, in a 3×3 matrix, is extracted from the position of white pixels in binarized frames 1310, 1312. The sample color mask 1320 is compared at 1330 against a color palette 1340, to provide recognition of a fluid color.

In case of varying fluid color in the same graphical layout, the above operation can be performed at each incremental/decremental fluid level. From the fluid flow rate verification described previously, the amount of actual fluid is detected, and input is taken from the test about the expected color. For any deviation on the associated actual color for its corresponding fluid level, an anomaly is recorded.

Fluid color verification plays a very important role in various chemical industries. For example, if two or more chemical compounds have been mixed, the resultant chemical composition is observed after a certain duration. If the expected resultant chemical color is not matching with the actual chemical color, and creates a hazardous mixed component, an alarm should immediately be generated after registering this event as an anomaly.

Fluid graphics color verification is also important for safety critical transportation and in the medical industry. If fuel or oxygen quantity goes very low, but a display icon is still in a green color instead of red, it may not draw an operator's attention, causing an increased chance of accident.

Fluid Type Verification

In fluid mechanics, fluid type plays an important role. The fluid type can be varied such as steady or unsteady fluid flow, laminar or turbulent fluid flow, or the like. In a steady fluid flow, the velocity of the fluid is constant at any point in time, whereas for unsteady fluid flow, the fluid's velocity can differ at any point time. The volume of fluid passed per interval of time is called the fluid flow rate, and can be expressed as:

Flow Rate=Area*Velocity.

The fluid flow rate can be determined by applying the present approach, where the trigger detection can provide a state transition, and the frame number indicates when the state transition occurred. To determine steady and unsteady fluid flow, the following equation can be applied:

$$\Delta W/\Delta T = (W_{i+1} - W_i)/(1/FPS)$$

where $W_x$ (x=i in the equation) is the number of white pixels at a cropped region of interest, which is retrieved by performing a binarization and histogram analysis. The $\Delta W$ is the differential white pixels and the $\Delta T$ is the differential timing, which can be calculated from the captured video's frames per second.

Figure 14:
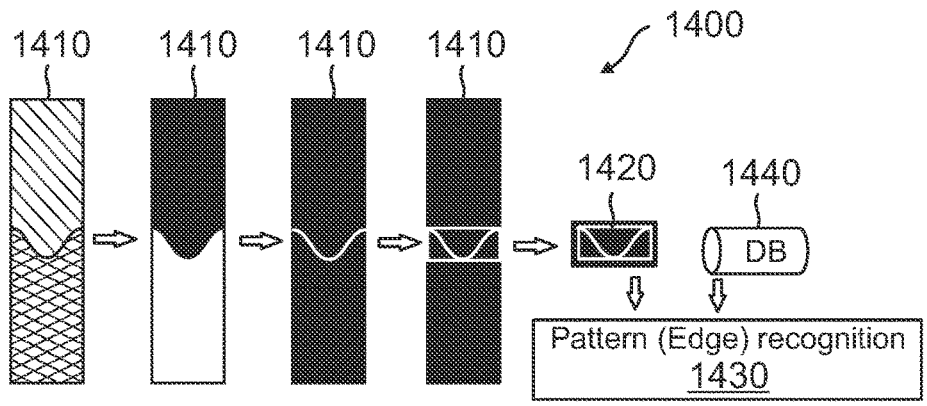
FIG. 14 is pictorial representation of an exemplary method to provide detection of a fluid pattern.

To differentiate fluid type, such as laminar or turbulent flow, the region of interest is binarized and edge detection is performed. For example, FIG. 14 is a pictorial representation of an exemplary method 1400 to provide the detection of a fluid pattern, such as for turbulent fluid pattern recognition. Using connected component analysis, an edge region 1420 is detected and extracted from a binarized region of interest 1410. The edge region 1420 and can be analyzed with any pattern (edge) recognition algorithm 1430 (or even a machine learning algorithm) that will compare edge region 1420 against stored patterns within a database (DB) 1440.

Even in the case of a sudden change of a short duration, the fluid direction can be determined with the present approach.

Statistical ways of deriving conclusions about laminar vs turbulent fluid flow may not always provide good accuracy, and also do not provide conclusions about the type of fluid. While fluid type may be assigned based on the above derived features (steady\unsteady, laminar\turbulent), there might exist certain other latent patterns of the fluid under observation. Hence, an alternate approach provides for machine learning-based fluid type detection, which utilizes a trained classifier model generated by machine learning or neural network-based model development.

Figure 15:
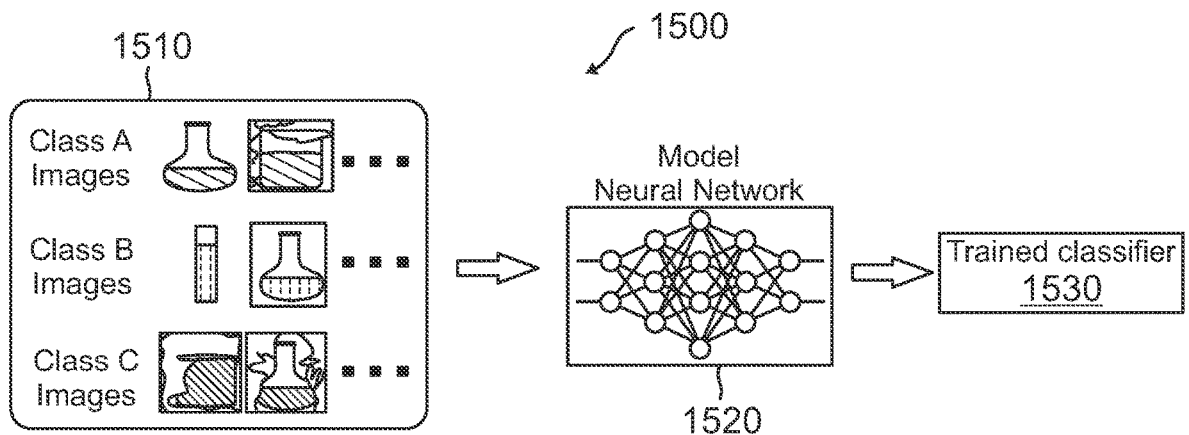
FIG. 15 is a pictorial representation of an exemplary method to provide for machine learning-based fluid type detection.

For example, FIG. 15 is a pictorial representation of an exemplary method 1500 to provide for machine learning-based fluid type detection. In this example, a set of images 1510 of different chemical classes, such as Class A images, Class B images, and Class C images, are sent to a model neural network 1520, which is operative to provide for training of a classifier model using images 1510. A trained classifier 1530 is then generated and output by model neural network 1520. The trained classifier 1530 can then be used to classify a chemical under test (e.g., resultant chemical after performing reaction) at each frame.

Using learning-based model prediction can help in classifying chemicals having certain latent patterns, such as generated smog, bubbles, sediments, color mixtures, or the like, which cannot be easily detected using statistical modeling. If the detected fluid is different than expected, an anomaly can be triggered to draw a tester's attention.

Fluid type classification plays a very important role for chemical industries. For example, experimental analysis of given chemicals may generate certain other chemicals that can be injurious to health, or can create certain hazardous effects with an immediate need to stop the reaction. The present vision-based automation helps in this process.

Anomaly Recording and Warning Generation

Based on the feature analysis performed for fluid flow rate verification, fluid color verification, or fluid type verification, all anomalies are recorded and an alarm can be triggered. For example, based on the derived fluid quantity, color, and classification output, an aural warning can be generated for a user.

In the case of a long duration chemical reaction such as performed in chemical industries, an immediate alarm can be triggered to prevent hazardous health effects. For software graphics verification, anomalies are recorded along with a timestamp, which a reviewer can validate later.

Example Evaluation

Figure 16:
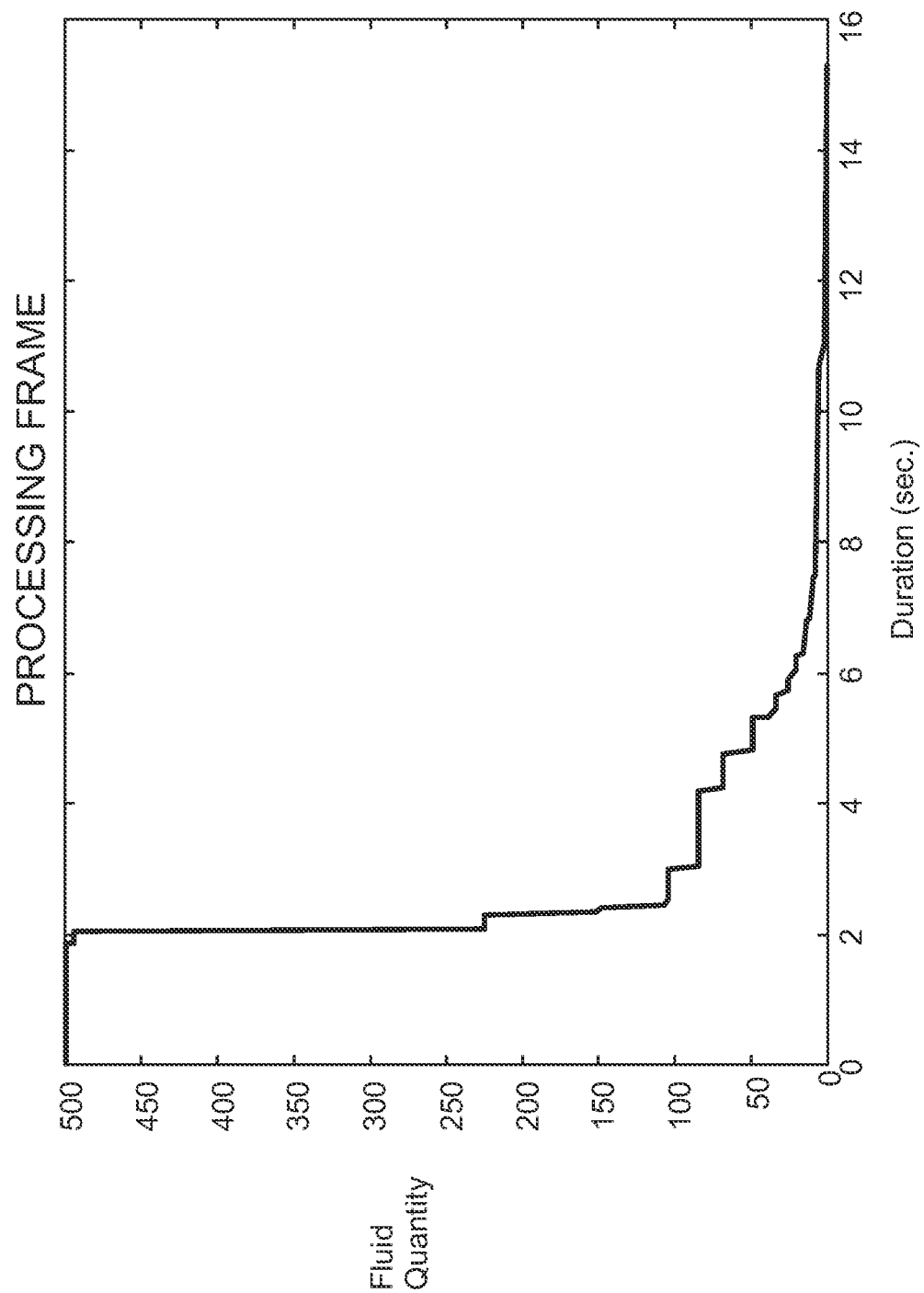
FIG. 16 is a fluid flow rate graph of the output for a processing frame in one example, showing a steady fluid decrement.

For detecting fluid quantity with color, a prototype was developed on an aerospace display verification Multi-Function Display. Graphics corresponding to fuel quantity were simulated for the fluid full to empty case. Video was captured at 20 FPS and at a data rate of 400 Kbps. The video consisted of 306 frames with a duration of 15.3 seconds. FIG. 16 is a fluid flow rate graph showing the output for a processing frame in this example. The y-axis in FIG. 16 denotes fluid quantity, and the scale of the y-axis was set as per physical requirement of the tank; the x-axis denotes duration in seconds. As shown in FIG. 16, the quantity of fluid decreased per frame from 2 second onwards, with no sudden spike, and with steady decrement.

In various embodiments, the present system and method can be implemented in hardware devices with embedded software that can be connected securely to the cloud via wired or wireless connection. The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a system for fluid flow verification, the system comprising: a video recording device operative to capture video frames of an actual fluid or a fluid display; and at least one processor operatively coupled to the video recording device, wherein the at least one processor hosts a plurality of fluid verification modules comprising: a fluid flow rate verification module including instructions to cause the at least one processor to: receive a plurality of video frames captured by the video recording device; for each of the video frames, binarize a region of interest and compute therefrom a histogram of white pixels and black pixels; count the white pixels in each of the video frames to detect an actual fluid quantity; determine whether the actual fluid quantity matches an expected fluid quantity at a given time; if the actual fluid quantity matches the expected fluid quantity, measure a fluid rate of change; determine whether there is a steady fluid flow based on the fluid rate of change; and if there is not a steady fluid flow, report a presence of a fluid flow rate anomaly; and a fluid color verification module including instructions to cause the at least one processor to: receive the plurality of video frames captured by the video recording device; receive the binarized region of interest and the histogram of white pixels and black pixels, for each of the video frames, from the fluid flow rate verification module; detect a fluid color by extracting a sample color mask of pixels from a position of the white pixels in each binarized region of interest; determine whether the detected fluid color matches an expected fluid color at the given time; and if the detected fluid color does not match the expected fluid color, report a presence of a fluid color anomaly.

Example 2 includes the system of Example 1, wherein the fluid verification modules further comprise: a fluid type verification module that includes instructions to cause the at least one processor to: receive the plurality of video frames captured by the video recording device; for each of the video frames, binarize a region of interest and perform an edge pattern analysis to detect a fluid type; determine whether the detected fluid type matches an expected fluid type; and if the detected fluid type does not match the expected fluid type, report a presence of a fluid type anomaly.

Example 3 includes the system of any of Examples 1-2, wherein if a direction of fluid flow or fluid fill is incorrect, the fluid flow rate verification module reports a fluid direction anomaly.

Example 4 includes the system of any of Examples 1-3, wherein the video recording device is operative to capture video frames of an actual fluid flow, or a graphical fluid flow display.

Example 5 includes the system of any of Examples 1-4, wherein the white pixels in the histogram represent presence of fluid, and the black pixels in the histogram represent absence of fluid.

Example 6 includes the system of any of Examples 1-5, wherein the ratio of white pixels to black pixels for each frame corresponds to a relative quantity of fluid.

Example 7 includes the system of any of Examples 1-6, wherein the expected fluid quantity at the given time is retrieved from a database and correlated with the actual fluid quantity using a pixel map.

Example 8 includes the system of any of Examples 1-7, wherein the fluid rate of change is measured from a last video frame to a present video frame, by a detecting a fluid flow direction and a fluid flow magnitude.

Example 9 includes the system of Example 8, wherein the fluid flow magnitude is detected using a time series prediction module operative to: receive a fluid quantity value from previous frames; calculate and output a model predicted value for a fluid quantity at a current frame; compare the model predicted value with an actual fluid quantity at the current frame; and if the actual fluid quantity is deviated from the model predicted value by more than a threshold, an anomaly is detected for the current frame.

Example 10 includes a method for fluid flow verification, the method comprising: providing a fluid flow rate verification module including instructions to cause at least one processor to perform a method comprising: receiving a plurality of video frames showing an actual fluid or a fluid display; binarizing a region of interest for each of the video frames; computing a histogram of white pixels and black pixels for each binarized region of interest; counting the white pixels in each histogram to detect an actual fluid quantity; retrieving an expected fluid quantity at a given time from a database; determining whether the actual fluid quantity matches an expected fluid quantity at a given time; if the actual fluid quantity matches the expected fluid quantity, measuring a fluid rate of change; determining whether there is a steady fluid flow based on the fluid rate of change; and if there is not a steady fluid flow, reporting a fluid flow rate anomaly.

Example 11 includes the method of Example 10, further comprising:
providing a fluid color verification module including instructions to cause the at least one processor to perform a method comprising: receiving the plurality of video frames showing the actual fluid or the fluid display; receiving each binarized region of interest and the histogram of white pixels and black pixels, from the fluid flow rate verification module; detecting a fluid color by extracting a sample color mask of pixels from a position of the white pixels in each binarized region of interest; retrieving an expected fluid color at a given time from a database; determining whether the detected fluid color matches the expected fluid color at the given time; and if the detected fluid color does not match the expected fluid color, reporting a fluid color anomaly.

Example 12 includes the method of any of Examples 10-11, further comprising: providing a fluid type verification module that includes instructions to cause at least one processor to perform a method comprising: obtaining a plurality of video frames of a fluid; inputting the video frames into a trained classifier model operative to generate a detected fluid type of the fluid based on the video frames; outputting the detected fluid type from the trained classifier model; retrieving an expected fluid type from a database; determining whether the detected fluid type matches the expected fluid type; and if the detected fluid type does not match the expected fluid type, reporting a fluid type anomaly.

Example 13 includes the method of Example 12, wherein the trained classifier model is produced by a process comprising: obtaining an image set for each of a plurality of different chemical classes; and inputting each image set into a model neural network operative to process each image set with machine learning to generate the trained classifier model.

Example 14 includes the method of Example 13, wherein one or more of the image sets show images of chemicals under reaction or perturbation.

Example 15 includes the method of any of Examples 13-14, wherein the trained classifier model is operative to classify a chemical under test at each video frame.

Example 16 includes the method of any of Examples 10-15, wherein the video frames depict an actual fluid flow, or a graphical fluid flow display.

Example 17 includes the method of any of Examples 10-16, wherein the white pixels in the histogram represent presence of fluid, and the black pixels in the histogram represent absence of fluid.

Example 18 includes the method of any of Examples 10-17, wherein the ratio of white pixels to black pixels for each frame corresponds to a relative quantity of fluid.

Example 19 includes the method of any of Examples 10-18, wherein the expected fluid quantity at the given time is retrieved from a database and correlated with the actual fluid quantity using a pixel map.

Example 20 includes the method of any of Examples 10-19, wherein the fluid rate of change is measured from a last video frame to a present video frame, by a detecting a fluid flow direction and a fluid flow magnitude.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system for fluid flow verification, the system comprising:
   a video recording device operative to capture video frames of an actual fluid or a fluid display; and
   at least one processor operatively coupled to the video recording device, wherein the at least one processor hosts a plurality of fluid verification modules comprising:
   a fluid flow rate verification module including instructions to cause the at least one processor to:
      receive a plurality of video frames captured by the video recording device;
      for each of the video frames, binarize a region of interest and compute therefrom a histogram of white pixels and black pixels;
      count the white pixels in each of the video frames to detect an actual fluid quantity;
      determine whether the actual fluid quantity matches an expected fluid quantity at a given time;
      if the actual fluid quantity matches the expected fluid quantity, measure a fluid rate of change;
      determine whether there is a steady fluid flow based on the fluid rate of change; and
      if there is not a steady fluid flow, report a presence of a fluid flow rate anomaly; and
   a fluid color verification module including instructions to cause the at least one processor to:
      receive the plurality of video frames captured by the video recording device;
      receive the binarized region of interest and the histogram of white pixels and black pixels, for each of the video frames, from the fluid flow rate verification module;
      detect a fluid color by extracting a sample color mask of pixels from a position of the white pixels in each binarized region of interest;
      determine whether the detected fluid color matches an expected fluid color at the given time; and
      if the detected fluid color does not match the expected fluid color, report a presence of a fluid color anomaly.

2. The system of claim 1, wherein the fluid verification modules further comprise:
   a fluid type verification module that includes instructions to cause the at least one processor to:
      receive the plurality of video frames captured by the video recording device;
      for each of the video frames, binarize a region of interest and perform an edge pattern analysis to detect a fluid type;
      determine whether the detected fluid type matches an expected fluid type; and
      if the detected fluid type does not match the expected fluid type, report a presence of a fluid type anomaly.

3. The system of claim 1, wherein if a direction of fluid flow or fluid fill is incorrect, the fluid flow rate verification module reports a fluid direction anomaly.

4. The system of claim 1, wherein the video recording device is operative to capture video frames of an actual fluid flow, or a graphical fluid flow display.

5. The system of claim 1, wherein the white pixels in the histogram represent presence of fluid, and the black pixels in the histogram represent absence of fluid.

6. The system of claim 1, wherein the ratio of white pixels to black pixels for each frame corresponds to a relative quantity of fluid.

7. The system of claim 1, wherein the expected fluid quantity at the given time is retrieved from a database and correlated with the actual fluid quantity using a pixel map.

8. The system of claim 1, wherein the fluid rate of change is measured from a last video frame to a present video frame, by a detecting a fluid flow direction and a fluid flow magnitude.

9. The system of claim 8, wherein the fluid flow magnitude is detected using a time series prediction module operative to:
receive a fluid quantity value from previous frames;
calculate and output a model predicted value for a fluid quantity at a current frame;
compare the model predicted value with an actual fluid quantity at the current frame; and
if the actual fluid quantity is deviated from the model predicted value by more than a threshold, an anomaly is detected for the current frame.

10. A method for fluid flow verification, the method comprising:
providing a fluid flow rate verification module including instructions to cause at least one processor to perform a method comprising:
receiving a plurality of video frames showing an actual fluid or a fluid display;
binarizing a region of interest for each of the video frames;
computing a histogram of white pixels and black pixels for each binarized region of interest;
counting the white pixels in each histogram to detect an actual fluid quantity;
retrieving an expected fluid quantity at a given time from a database;
determining whether the actual fluid quantity matches an expected fluid quantity at a given time;
if the actual fluid quantity matches the expected fluid quantity, measuring a fluid rate of change;
determining whether there is a steady fluid flow based on the fluid rate of change; and
if there is not a steady fluid flow, reporting a fluid flow rate anomaly.

11. The method of claim 10, further comprising:
providing a fluid color verification module including instructions to cause the at least one processor to perform a method comprising:
receiving the plurality of video frames showing the actual fluid or the fluid display;
receiving each binarized region of interest and the histogram of white pixels and black pixels, from the fluid flow rate verification module;
detecting a fluid color by extracting a sample color mask of pixels from a position of the white pixels in each binarized region of interest;
retrieving an expected fluid color at a given time from a database;
determining whether the detected fluid color matches the expected fluid color at the given time; and
if the detected fluid color does not match the expected fluid color, reporting a fluid color anomaly.

12. The method of claim 10, further comprising:
providing a fluid type verification module that includes instructions to cause at least one processor to perform a method comprising:
obtaining a plurality of video frames of a fluid;
inputting the video frames into a trained classifier model operative to generate a detected fluid type of the fluid based on the video frames;
outputting the detected fluid type from the trained classifier model;
retrieving an expected fluid type from a database;
determining whether the detected fluid type matches the expected fluid type; and
if the detected fluid type does not match the expected fluid type, reporting a fluid type anomaly.

13. The method of claim 12, wherein the trained classifier model is produced by a process comprising:
obtaining an image set for each of a plurality of different chemical classes; and
inputting each image set into a model neural network operative to process each image set with machine learning to generate the trained classifier model.

14. The method of claim 13, wherein one or more of the image sets show images of chemicals under reaction or perturbation.

15. The method of claim 13, wherein the trained classifier model is operative to classify a chemical under test at each video frame.

16. The method of claim 10, wherein the video frames depict an actual fluid flow, or a graphical fluid flow display.

17. The method of claim 10, wherein the white pixels in the histogram represent presence of fluid, and the black pixels in the histogram represent absence of fluid.

18. The method of claim 17, wherein the ratio of white pixels to black pixels for each frame corresponds to a relative quantity of fluid.

19. The method of claim 10, wherein the expected fluid quantity at the given time is retrieved from a database and correlated with the actual fluid quantity using a pixel map.

20. The method of claim 10, wherein the fluid rate of change is measured from a last video frame to a present video frame, by a detecting a fluid flow direction and a fluid flow magnitude.

* * * * *